United States Patent
Cseri et al.

(10) Patent No.: US 12,461,940 B2
(45) Date of Patent: Nov. 4, 2025

(54) CROSS-CLOUD REPLICATION OF RECURRENTLY EXECUTING DATA PIPELINES

(71) Applicant: Snowflake Inc., Bozeman, MT (US)

(72) Inventors: Istvan Cseri, Seattle, WA (US); Dinesh Chandrakant Kulkarni, Sammamish, WA (US); Mihir Dhananjay Kulkarni, Foster City, CA (US); Lanhao Wu, Seattle, WA (US); Di Fei Zhang, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 61 days.

(21) Appl. No.: 17/823,752

(22) Filed: Aug. 31, 2022

(65) Prior Publication Data

US 2023/0401232 A1    Dec. 14, 2023

Related U.S. Application Data

(60) Provisional application No. 63/366,084, filed on Jun. 9, 2022.

(51) Int. Cl.
G06F 16/27    (2019.01)
G06F 21/62    (2013.01)

(52) U.S. Cl.
CPC ........ *G06F 16/275* (2019.01); *G06F 21/6218* (2013.01)

(58) Field of Classification Search
CPC .......................... G06F 16/275; G06F 21/6218
USPC .......................................................... 706/611
See application file for complete search history.

(56) References Cited

U.S. PATENT DOCUMENTS

| | | | | |
|---|---|---|---|---|
| 11,343,142 B1* | 5/2022 | Wang | ................. | H04L 41/0813 |
| 11,528,262 B2* | 12/2022 | Carru | ...................... | H04L 63/08 |
| 11,620,310 B1* | 4/2023 | Akidau | ................. | G06F 16/273 |
| | | | | 707/615 |
| 11,687,487 B1* | 6/2023 | Abdul-Jawad | ........ | G06F 16/258 |
| | | | | 707/704 |
| 2015/0142739 A1* | 5/2015 | Mutalik | .............. | G06F 11/1464 |
| | | | | 707/613 |
| 2016/0048408 A1* | 2/2016 | Madhu | .................. | H04L 47/783 |
| | | | | 718/1 |
| 2017/0344618 A1* | 11/2017 | Horowitz | ............ | G06F 11/2097 |
| 2018/0026867 A1* | 1/2018 | McAlister | ........... | G06F 11/2028 |
| | | | | 709/224 |
| 2018/0260125 A1* | 9/2018 | Botes | ....................... | G06F 3/065 |
| 2020/0012659 A1* | 1/2020 | Dageville | ............. | G06F 16/245 |
| 2020/0125540 A1* | 4/2020 | Thatte | ................... | G06F 16/258 |

(Continued)

OTHER PUBLICATIONS

"International Application Serial No. PCT US2023 024786, International Search Report mailed Jul. 12, 2023", 2 pages.

(Continued)

*Primary Examiner* — Tony Mahmoudi
*Assistant Examiner* — Kamal K Dewan
(74) *Attorney, Agent, or Firm* — Schwegman Lundberg & Woessner, P.A.

(57) ABSTRACT

In one aspect, a computer-implemented method includes detecting a committed version of recurrently executed tasks of a first data pipeline on a primary deployment that is hosted on a first cloud service, and replicating the committed version of the recurrently executed tasks to a second data pipeline on a secondary deployment that is hosted on a second cloud service.

18 Claims, 14 Drawing Sheets

(56) References Cited

U.S. PATENT DOCUMENTS

| | | | |
|---|---|---|---|
| 2021/0019237 A1* | 1/2021 | Karr | G06F 11/1469 |
| 2021/0034571 A1* | 2/2021 | Bedadala | G06F 16/134 |
| 2021/0081432 A1* | 3/2021 | Grunwald | G06F 11/1471 |
| 2021/0117232 A1* | 4/2021 | Sriharsha | G06F 16/1734 |
| 2021/0258366 A1* | 8/2021 | Sinha | H04L 67/025 |
| 2022/0030062 A1* | 1/2022 | Jennings | H04L 67/1097 |
| 2022/0114058 A1* | 4/2022 | Mylavarapu | G06F 11/1458 |
| 2022/0263897 A1* | 8/2022 | Karr | G06F 11/1448 |
| 2023/0083480 A1* | 3/2023 | Karumbunathan | G06F 3/0688 709/216 |
| 2023/0129453 A1* | 4/2023 | Thatikonda | G06F 8/71 717/120 |
| 2023/0209105 A1* | 6/2023 | Kozak | H04N 21/25841 725/93 |
| 2023/0214289 A1* | 7/2023 | Bramble | G06F 11/0706 714/2 |

OTHER PUBLICATIONS

"International Application Serial No. PCT US2023 024786, Written Opinion mailed Jul. 12, 2023", 8 pages.
"International Application Serial No. PCT/US2023/024786, International Preliminary Report on Patentability mailed Dec. 19, 2024", 10 pgs.

* cited by examiner

CROSS-CLOUD REPLICATION OF RECURRENTLY EXECUTING DATA PIPELINES

CROSS-CLOUD REPLICATION OF RECURRENTLY EXECUTING DATA PIPELINES

The present application claims priority to U.S. Provisional Patent Application Ser. No. 63/366,084, filed Jun. 9, 2022, which is hereby incorporated by reference in its entirety.

TECHNICAL FIELD

The present disclosure generally relates to a network-based database system and, more specifically, to replicating recurrently executing data pipelines for cross-organization and cross-cloud.

BACKGROUND

Network-based database systems may be provided through a cloud platform, which allows organizations and users to store, manage, and retrieve data from the cloud. With respect to type of data processing, a database system could implement online transactional processing, online analytical processing, a combination of the two, and/or another type of data processing. Moreover, a database system could be or include a relational database management system and/or one or more other types of database management systems.

One such example is a cloud data warehouse (also referred to as a "network-based data warehouse" or simply as a "data warehouse"), which is a network-based system used for data analysis and reporting that comprises a central repository of integrated data from one or more disparate sources. A cloud data warehouse can store current and historical data that can be used for creating analytical reports for an enterprise. To this end, data warehouses can provide business intelligence tools, tools to extract, transform, and load data into the repository, and tools to manage and retrieve metadata.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
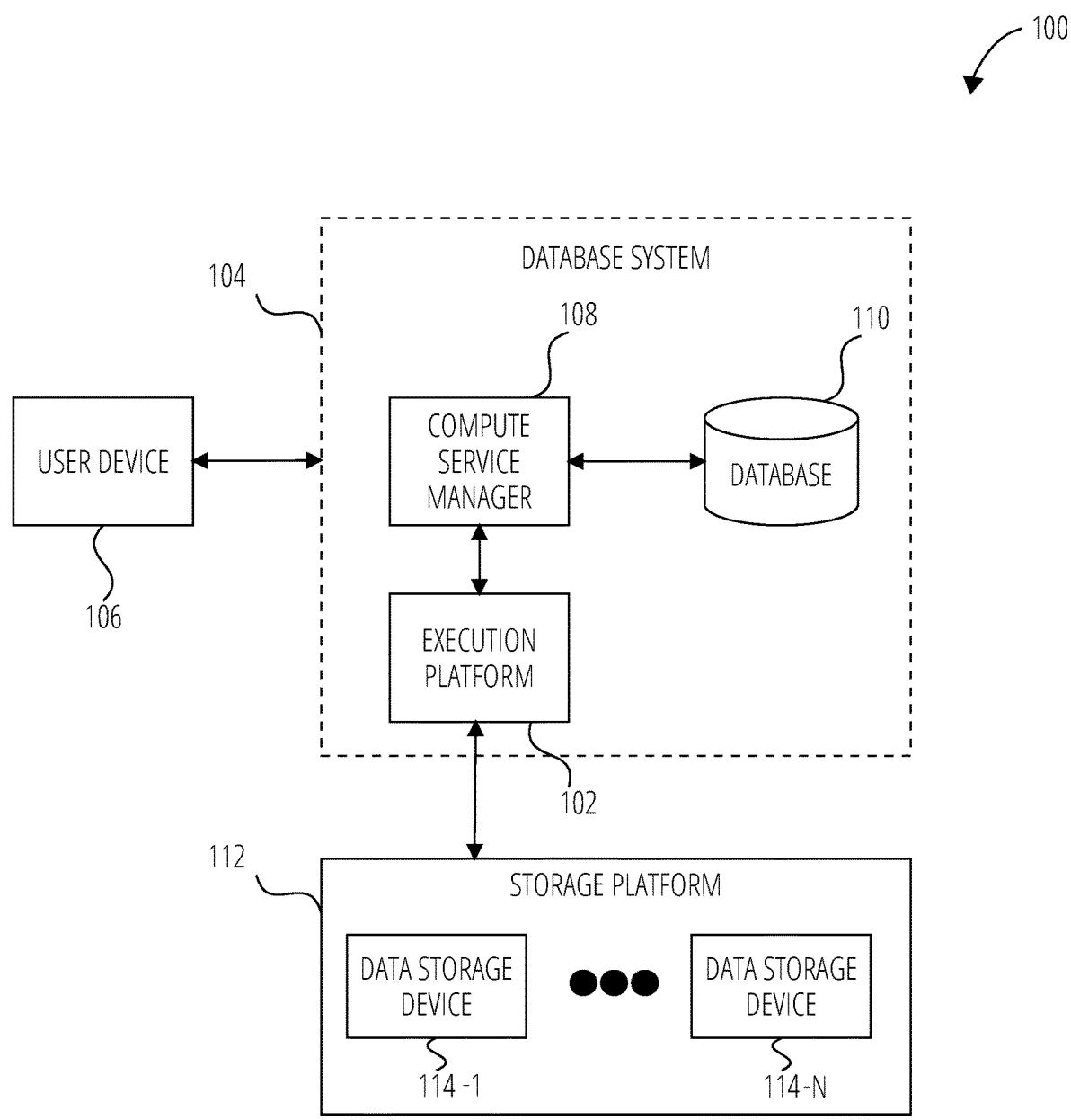
FIG. 1 illustrates an example computing environment that includes a network-based database system in communication with a cloud storage provider system, in accordance with some embodiments of the present disclosure.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

In some instances, it may be beneficial to replicate database data across multiple geographic locations, across multiple database vendors or providers, and/or across multiple computing devices that may be located in the same physical location or in two or more different locations. These multiple locations, vendors, providers, and/or computing devices may be referred to herein as "deployments." This may provide significant benefits to a database client because the data is backed up in more than one location. In the event that one deployment is unavailable due to, for example, a power outage, a system error, a scheduled maintenance downtime, and so forth, a failover process ensures a different deployment takes over the management and operation of the database.

Continuity is sought in case of failure of a cloud service deployment or an underlying cloud provider zone or region. Continued execution of data pipelines that execute at regular intervals (e.g. every minute, every hour, . . . ) or based on frequent triggers is an important aspect of continuity. Replication is designed to work across regional and cloud provider boundaries so data pipeline replication follows the same framework while replicating from a primary database to a secondary database.

Like other database objects, a customer may continue to change data pipelines even as an earlier version executes concurrently with the changes. However, unlike data in a database, data pipelines are currently not changed transactionally and the latest version at any point may be in an incomplete state that is not suitable for execution. One or more components of the pipeline may require further changes before the pipeline as an entity is consistent and ready for execution again. An editor of a data pipeline explicitly decides when they are done with changes and creates a new version by "resuming" the pipeline explicitly. Hence, replication of data pipelines is to take into account versioning so that a (possibly older) consistent version is available on the secondary in the case of a failover.

Database objects are typically covered under database replication as of the time of replication achieved through periodic refreshes. Usually the state of every database object as of the time of refresh is replicated from the primary to the secondary. This approach may be unsuitable for data pipelines because a user may be in the middle of edits/tests and not consider the pipeline ready to run.

A customer decides how frequently they wish to replicate and hence they also need sufficient information to decide at failover if they want to use the replicated checkpoint or externally upgrade the checkpoint to a later state if they so desire. In this way, they get the minimum configured loss of recency with the ability to override it for a newer pipeline version (e.g., hourly replication still allows leeway for a user to override an hour-old version with a more recent one).

The presently described techniques do not require transactional changes to metadata and allow a user to decide when they are done with all the changes through an explicit action while still ensuring failover capability. The user is not constrained to completing their edits in any fixed amount of time—often required for transactions that timeout and abort if not completed. Simultaneously, the pipeline replication design takes care of replicating the last-known good version that the user has explicitly designated for execution. This limits the version skew between the latest on the primary and the latest on the secondary to the replication interval. The replication interval includes the time between two replication refresh operations.

Techniques for replicating recurrently executing data pipelines based on data change (resume command) are described. In the present approach, a user explicitly states when the changes are complete and the pipeline is execution-ready. The pipelines can be used for data ingestion or other specified tasks. These tasks can be operational across account, organization, cloud region, and cloud provider boundaries.

In one example embodiment, a computer-implemented method includes detecting a committed version of recurrently executed tasks of a data pipeline on the primary deployment hosted on the first cloud service, and replicating the committed version of the recurrently executed tasks to a data pipeline on the secondary deployment hosted on the second cloud service. In one example, the first cloud service and the second cloud service are on the same cloud. In another example, the first cloud service and the second cloud service are distinct and on separate clouds.

Using the techniques described herein, recurrently executing data pipelines can be replicated while making available a consistent version on a secondary pipeline. Thus, the techniques described herein offer improved data reliability compared to conventional techniques.

FIG. 1 illustrates an example computing environment 100 that includes a database system 104 in communication with a storage platform 112, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the database system 104 and a storage platform 112 (e.g., AWS®, Microsoft Azure Blob Storage®, or Google Cloud Storage®). The database system 104 is used for reporting and analysis of integrated data from one or more disparate sources including data storage device 114-1 to data storage device 114-N within the storage platform 112. The storage platform 112 comprises a plurality of computing machines and provides on-demand computer system resources such as data storage and computing power to the database system 104.

The database system 104 comprises a compute service manager 108, an execution platform 102, and a database 110. The database system 104 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the database system 104. The compute service manager 108 also performs query optimization and compilation as well as managing clusters of compute services that provide compute resources (also referred to as "virtual warehouses"). The compute service manager 108 can support any number of client accounts such as end users providing data storage and retrieval requests, system administrators managing the systems and methods described herein, and other components/devices that interact with the compute service manager 108.

The compute service manager 108 is also in communication with a user device 106. The user device 106 corresponds to a user of one of the multiple client accounts supported by the database system 104. In some embodiments, the compute service manager 108 does not receive any direct communications from the user device 106 and only receives communications concerning jobs from a queue within the database system 104.

The compute service manager 108 is also coupled to database 110, which is associated with the data stored in the computing environment 100. The database 110 stores data pertaining to various functions and aspects associated with the database system 104 and its users. In some embodiments, the database 110 includes a summary of data stored in remote data storage systems as well as data available from a local cache. Additionally, the database 110 may include information regarding how data is organized in remote data storage systems (e.g., storage platform 112) and the local caches. The database 110 allows systems and services to determine whether a piece of data needs to be accessed without loading or accessing the actual data from a storage device.

In some embodiments, the compute service manager 108 may determine that a job should be performed based on data from the database 110. In such embodiments, the compute service manager 108 may scan the data and determine that a job should be performed to improve data organization or database performance.

The compute service manager 108 is further coupled to the execution platform 102, which provides multiple computing resources that execute various data storage and data retrieval tasks. The execution platform 102 is coupled to the storage platform 112. The storage platform 112 comprises multiple data storage devices 114-1 to 114-N. In some embodiments, the data storage devices 114-1 to 114-N are cloud-based storage devices located in one or more geographic locations. For example, the data storage devices 114-1 to 114-N may be part of a public cloud infrastructure or a private cloud infrastructure. The data storage devices 114-1 to 114-N may be hard disk drives (HDDs), solid state drives (SSDs), storage clusters, Amazon S3™ storage systems or any other data storage technology. Additionally, the storage platform 112 may include distributed file systems (e.g., Hadoop Distributed File Systems (HDFS)), object storage systems, and the like.

The execution platform 102 comprises a plurality of compute nodes. A set of processes on a compute node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 102.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 114-1 to 114-N are decoupled from the computing resources associated with the execution platform 102. This architecture supports dynamic changes to the database system 104 based on the changing data storage/retrieval needs as well as the changing needs of the users and systems. The support of dynamic changes allows the database system 104 to scale quickly in response to changing demands on the systems and components within the database system 104. The decoupling of the computing resources from the data storage devices 114-1 to 114-N supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, the database 110, the execution platform 102, and the storage platform 112 are shown in FIG. 1 as individual discrete components. However, each of the compute service manager 108, the database 110, the execution platform 102, and the storage platform 112 may be implemented as a distributed system (e.g., distributed across multiple systems/platforms at multiple geographic locations). Additionally, each of the compute service manager 108, the database 110, the execution platform 102, and the storage platform 112 can be scaled up or down (independently of one another) depending on changes to the requests received and the changing needs of the database system 104. Thus, in the described embodiments, the database system 104 is dynamic and supports regular changes to meet the current data processing needs.

During typical operation, the database system 104 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 102 to process the task. The compute service manager 108 may determine what data is needed to process a task and further determine which nodes within the execution platform 102 are best suited to process the task. Some nodes may have already cached the data needed to process the task and, therefore, be a good candidate for processing the task.

Metadata stored in the database 110 assists the compute service manager 108 in optimizing user queries by determining which nodes in the execution platform 102 have already cached at least a portion of the data needed to process the task. In some embodiments, metadata includes a summary of data stored in remote data storage systems as well as data available from a local cache (e.g., a cache within one or more of the clusters of the execution platform 102). Additionally, metadata may include information regarding how data is organized in the remote data storage systems and the local caches. Metadata allows systems and services to determine whether a piece of data needs to be processed without loading or accessing the actual data from a storage device.

One or more nodes in the execution platform 102 process the task using data cached by the nodes and, if necessary, data retrieved from the storage platform 112. It is desirable to retrieve as much data as possible from caches within the execution platform 102 because the retrieval speed is typically much faster than retrieving data from the storage platform 112.

As shown in FIG. 1, the computing environment 100 separates the execution platform 102 from the storage platform 112. In this arrangement, the processing resources and cache resources in the execution platform 102 operate independently of the data storage devices 114-1 to 114-N in the storage platform 112. Thus, the computing resources and cache resources are not restricted to specific data storage devices 114-1 to 114-N. Instead, all computing resources and all cache resources may retrieve data from, and store data to, any of the data storage resources in the storage platform 112.

Figure 2:
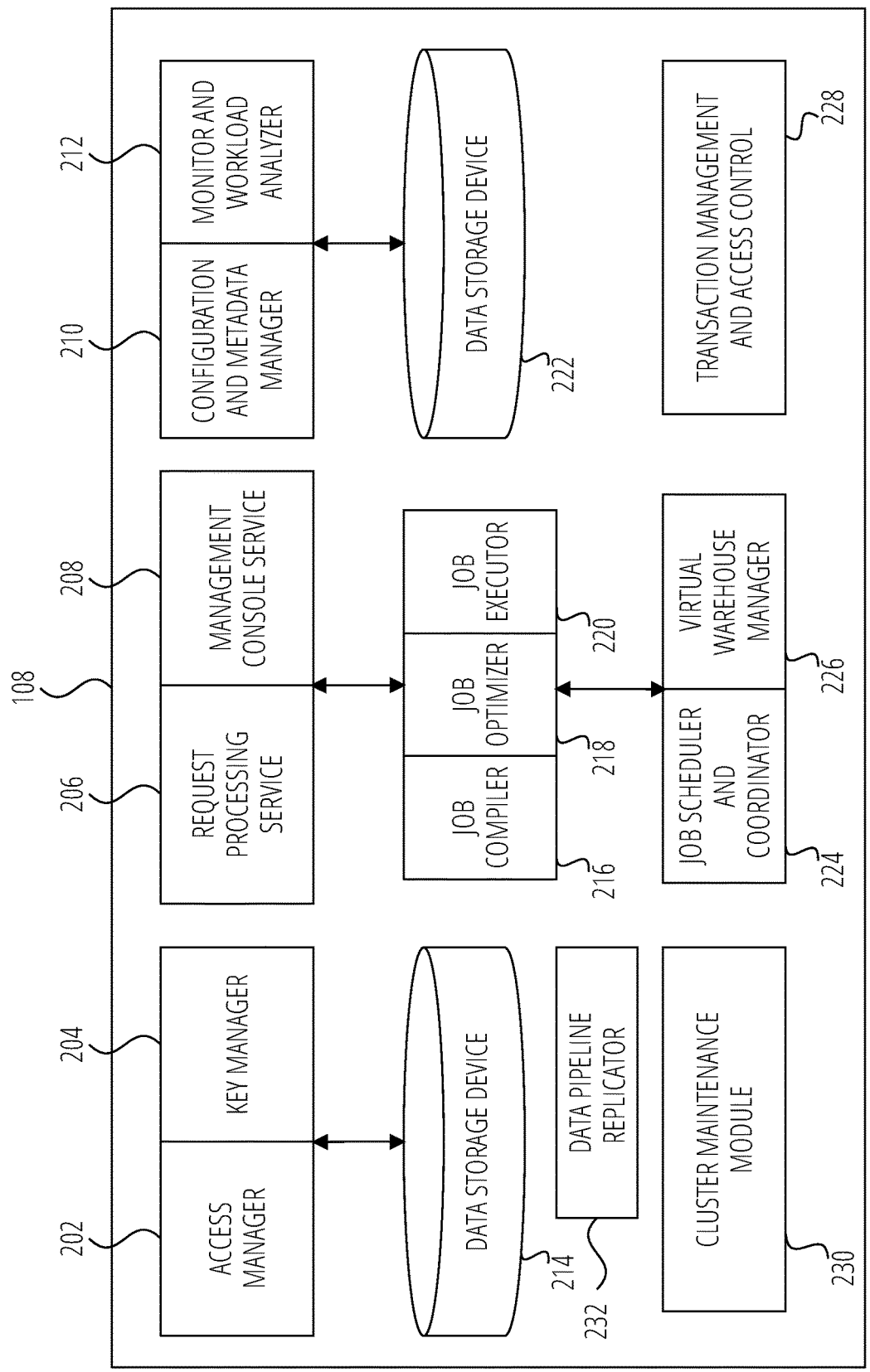
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202, a key manager 204, a request processing service 206, a management console service 208, a configuration and metadata manager 210, a monitor and workload analyzer 212, a data storage device 214, a job compiler 216, a job optimizer 218, a job executor 220, a data storage device 222, a job scheduler and coordinator 224, a virtual warehouse manager 226, a transaction management and access control 228, a cluster maintenance module 230, and a data pipeline replicator 232.

The access manager 202 and the key manager 204 coupled to the data storage device 214. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices 114-1 to 114-N in storage platform 112). As used herein, the remote storage devices may also be referred to as "persistent storage devices" or "shared storage devices."

The request processing service 206 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 102 or in a data storage device in storage platform 112.

The management console service 208 supports access to various systems and processes by administrators and other system managers. Additionally, the management console service 208 may receive a request to execute a job and monitor the workload on the system.

The job compiler 216 parses a job into multiple discrete tasks and generates the execution code for each of the multiple discrete tasks. The job optimizer 218 determines the best method to execute the multiple discrete tasks based on the data that needs to be processed. The job optimizer 218 also handles various data pruning operations and other data optimization techniques to improve the speed and efficiency of executing the job. The job executor 220 executes the execution code for jobs received from a queue or determined by the compute service manager 108.

The job scheduler and coordinator 224 sends received jobs to the appropriate services or systems for compilation, optimization, and dispatch to the execution platform 102. For example, jobs may be prioritized and processed in that prioritized order. In an embodiment, the job scheduler and coordinator 224 determines a priority for internal jobs that are scheduled by the compute service manager 108 with other "outside" jobs such as user queries that may be scheduled by other systems in the database but may utilize the same processing resources in the execution platform 102. In some embodiments, the job scheduler and coordinator 224 identifies or assigns particular nodes in the execution platform 102 to process particular tasks.

The virtual warehouse manager 226 manages the operation of multiple virtual warehouses implemented in the execution platform 102. As discussed below, each virtual warehouse includes multiple execution nodes that each include a cache and a processor.

The configuration and metadata manager 210 manages the information related to the data stored in the remote data storage devices and in the local caches (e.g., the caches in execution platform 102). In one example, the configuration and metadata manager 210 uses the metadata to determine which data micro-partitions need to be accessed to retrieve data for processing a particular task or job.

The monitor and workload analyzer 212 oversees processes performed by the compute service manager 108 and manages the distribution of tasks (e.g., workload) across the virtual warehouses and execution nodes in the execution platform 102. The monitor and workload analyzer 212 also redistributes tasks, as needed, based on changing workloads throughout the database system 104 and may further redistribute tasks based on a user (e.g., "external") query workload that may also be processed by the execution platform 102. The configuration and metadata manager 210 and monitor and workload analyzer 212 are coupled to the data storage device 222. The data storage device 222 and the data storage device 214 represent any data storage device within the database system 104. For example, data storage device 222 and the data storage device 214 may represent caches in execution platform 102, storage devices in storage platform 112, or any other storage device.

The transaction management and access control 228 manages the various tasks and other activities associated with the processing of data storage requests and data access requests. For example, the transaction management and access control 228 provides consistent and synchronized access to data by multiple users or systems. Since multiple users/systems may access the same data simultaneously, changes to the data may be synchronized to ensure that each user/system is working with the current version of the data. The transaction management and access control 228 provides control of various data processing activities at a single, centralized location in compute service manager 108.

The cluster maintenance module 230 manages the clustering and ordering of partitions of a table. The cluster maintenance module 230 may partition each table in a database into one or more partitions or micro-partitions. The cluster maintenance module 230 may not require or achieve ideal clustering for the table data but may maintain "good enough" or approximate clustering. For example, ideal clustering on a specific attribute may result in each partition either having non-overlapping value ranges or having only a single value for the specific attribute. Because the cluster maintenance module 230 does not require perfect clustering, significant processing and memory resources may be conserved during data loading or DML command operations.

The data pipeline replicator 232 replicates a last-known-good version of data pipeline that the user has explicitly designated for execution. In one example, the data pipeline replicator 232 replicates a committed version of the primary pipeline from one deployment to another deployment. In another example, the data pipeline replicator 232 replicates a committed version of the primary pipeline from one account to another.

At least some embodiments may manage the ordering or clustering of a table using micro-partitions. As mentioned previously, traditional data warehouses rely on static partitioning of large tables to achieve acceptable performance and enable better scaling. In these systems, a partition is a unit of management that is manipulated independently using specialized data definition language (DDL) and syntax. However, static partitioning has a number of well-known limitations, such as maintenance overhead and data skew, which can result in disproportionately-sized partitions. Embodiments disclosed herein may implement a powerful and unique form of partitioning, called micro-partitioning, that delivers all the advantages of static partitioning without the known limitations, as well as providing additional significant benefits.

In one embodiment, all data in tables is automatically divided into micro-partitions, which are contiguous units of storage. By way of example, each micro-partition may contain between 50 MB and 500 MB of uncompressed data (note that the actual size in storage may be smaller because data may be stored compressed). Groups of rows in tables are mapped into individual micro-partitions, organized in a columnar fashion. This size and structure allows for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

Figure 3:
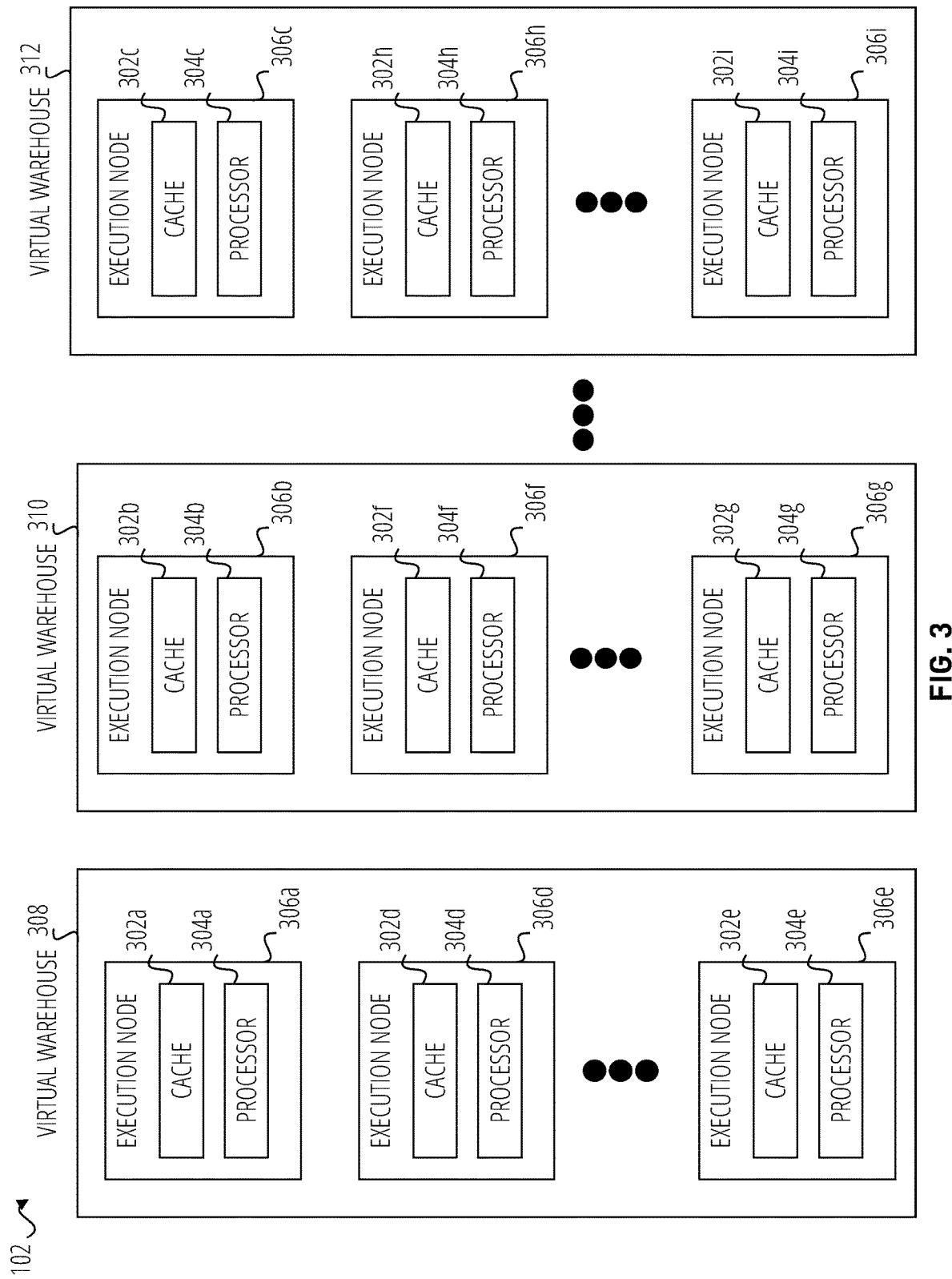
FIG. 3 is a block diagram illustrating components of an execution platform, in accordance with some embodiments of the present disclosure.

FIG. 3 is a block diagram illustrating components of the execution platform 102, in accordance with some embodiments of the present disclosure. As shown in FIG. 3, the execution platform 102 includes multiple virtual warehouses, including virtual warehouse 308, virtual warehouse 310, virtual warehouse 312. Each virtual warehouse includes multiple execution nodes that each includes a data cache and a processor. The virtual warehouses can execute multiple tasks in parallel by using the multiple execution nodes. As discussed herein, the execution platform 102 can add new virtual warehouses and drop existing virtual warehouses in real-time based on the current processing needs of the systems and users. This flexibility allows the execution platform 102 to quickly deploy large amounts of computing resources when needed without being forced to continue paying for those computing resources when they are no longer needed. All virtual warehouses can access data from any data storage device (e.g., any storage device in storage platform 112).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 114-1 to 114-N shown in FIG. 1. Thus, the virtual warehouses are not necessarily assigned to a specific data storage devices 114-1 to 114-N and, instead, can access data from any of the data storage devices 114-1 to 114-N within the storage platform 112. Similarly, each of the execution nodes shown in FIG. 3 can access data from any of the data storage devices 114-1 to 114-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 308 includes three execution nodes (execution node 306a, 306d, 306e). The execution node 306a includes a cache 302a and a processor 304a. Execution node 306d includes a cache 302d and a processor 304d. Execution node 306e includes a cache 302e and a processor 304e.

Each execution node 306a, 306d, 306e is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 308 discussed above, virtual warehouse 310 includes three execution nodes (execution node 306b, 306f, 306g). Execution node 306b includes a cache 302b and a processor 304b. Execution node 306f includes a cache 302f and a processor 304f. Execution node 306g includes a cache 302g and a processor 304g.

Similar to virtual warehouse 308 and virtual warehouse 310 discussed above, virtual warehouse 312 includes three execution nodes (execution node 306c, 306h, 306i). Execution node 306c includes a cache 302c and a processor 304c. Execution node 306h includes a cache 302h and a processor 304h. Execution node 306i includes a cache 302i and a processor 304i.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 112. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 112.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouse 308, 310, and 312 are associated with the same execution platform 102, the virtual warehouses may be implemented using multiple computing systems at multiple geographic locations. For example, virtual warehouse 308 can be implemented by a computing system at a first geographic location, while virtual warehouse 310 and virtual warehouse 312 are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 308 implements execution node 306a and 306d on one computing platform at a geographic location and implements execution node 306e at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 102 is also fault tolerant. For example, if one virtual warehouse fails, that virtual warehouse is quickly replaced with a different virtual warehouse at a different geographic location.

A particular execution platform 102 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 112, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
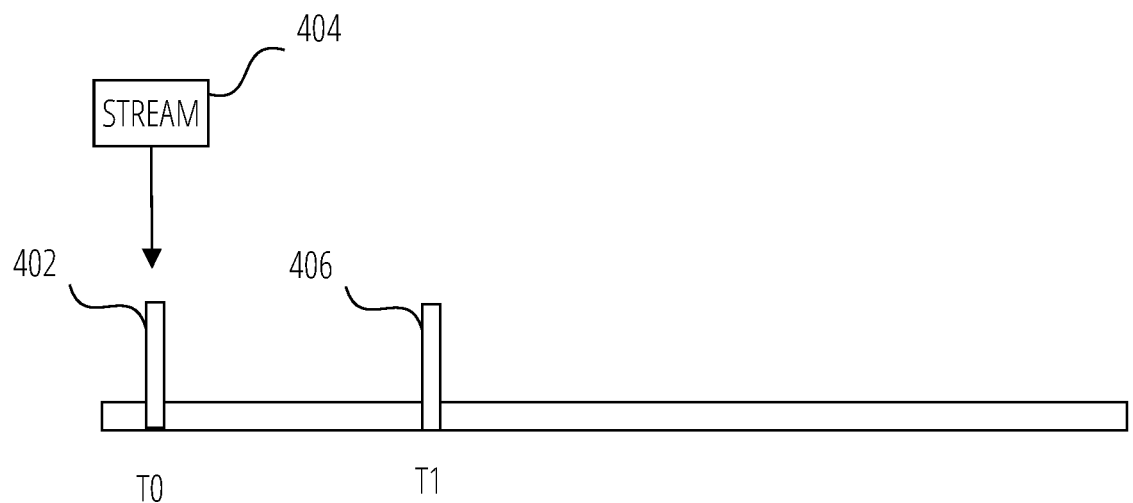
FIG. 4 illustrates an example of a stream in accordance with one example embodiment.

FIG. 4 illustrates an example of a stream in accordance with one example embodiment. The automatic pipeline execution techniques can utilize change data capture (CDC) information, such as streams, to trigger specified tasks. A stream is a virtual table showing CDC information between two versions of a table. A primary table 402 (also referred to as a base table) may be provided. The primary table 402 may store a set of data, for example customer data for a client. In some embodiments, the primary table 402 may be implemented as a view, which allows a result of a query to be accessed as if it were a table. In some embodiments, the primary table 402 may be implemented as a set of tables.

The primary table 402 is illustrated as having two versions: T0 and T1. The versions may reflect changes (or modifications), such as data manipulation language (DML) operations executed on the primary table 402.

Data in the primary table 402 may automatically be divided into an immutable storage device referred to as a micro-partition (also referred to as a partition). A micro-partition may be an immutable storage device in a database table that cannot be updated in-place and must be regenerated when the data stored therein is modified. A micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can comprise millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

A stream 404 (ST0) may be generated from the primary table 402. A stream is a virtual table showing change data capture (CDC) information between two points. Here, stream 404 (ST0) may show the CDC information between T0 and T1 table versions. Being a virtual table, the stream does not store information itself, but instead includes pointers to the underlying information. In this example, the stream 404 (ST0) includes a set of pointers to the primary table 402. Multiple streams may be generated for different points of time. Streams or CDC information can be used as part of a triggering mechanism for tasks for implementing a data pipeline.

Figure 5:
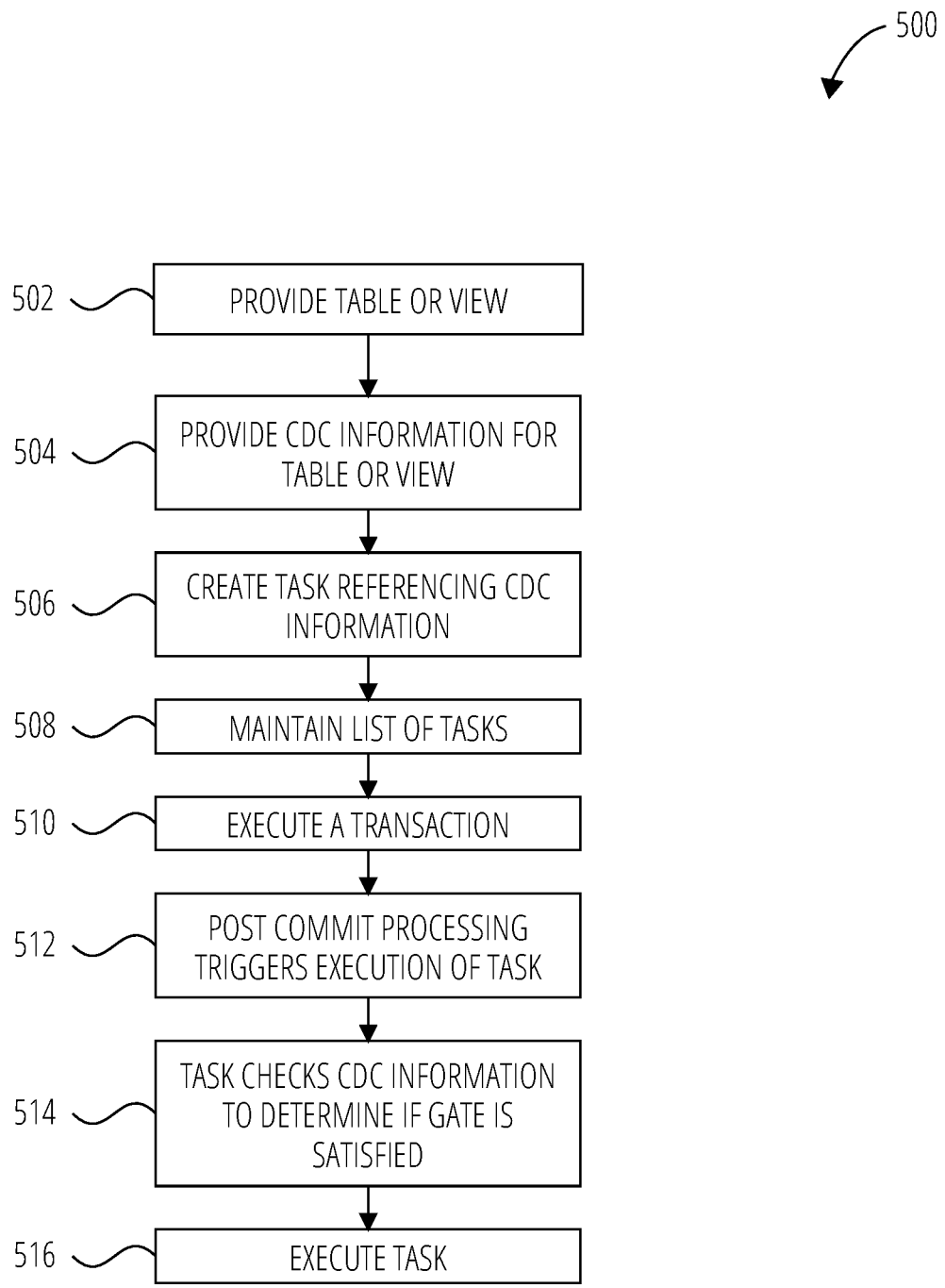
FIG. 5 is a flow diagram illustrating a method for executing tasks, in accordance with some embodiments of the present disclosure.

FIG. 5 illustrates a flow diagram from a method 500 for triggering tasks, according to some example embodiments. At block 502, a table or a view may be provided. At block 504, CDC information or a stream indicating changes to the table or view may be provided. At block 506, a task may be created that depends on the table or view by referencing the stream/CDC information. The task may also be called a subscriber task for the changes to the underlying table directly or indirectly via a view on the table. An example for creating a task called "task1" is illustrated:

---
CREATE TASK task1
WHEN
   SYSTEM$STREAM_HAS_DATA ('Table1Stream1')
AS
   [body of task1]

---

"Table1Stream1" represents the stream/CDC information for the underlying table "Table1". Thus, "task1" is triggered by a change committed to "Table1". When "task1" is triggered, the body of task1 is executed.

At operation 508, a list of tasks is maintained by the database system (e.g., database system 102). At operation 510, a transaction is executed, which results in a change to the data in the table. At operation 512, a post-commit processing of the transaction execution triggers the tasks from the list of tasks for immediate execution. The system may maintain a reverse mapping from table to dependent tasks. In the example above, task1 depends on table1. In some examples, a task can depend on more than one table. Moreover, a table may be associated with multiple task dependencies. Referring to the example above, when a new version for table1 is committed (i.e., change to the table results in the creation of a new version of a table), the dependency mapping is used to determine which tasks to trigger.

The triggered tasks may then be scheduled for processing by placing them in a queue of a background scheduler. This triggering is synchronous with the post-commit processing, but execution of the task is asynchronous with respect to the triggering. Consequently, the execution of the task is decoupled from the normal transaction execution, and the task execution does not impact the post-commit processing of the transaction.

At operation 514, the task may check the CDC information or stream to determine if the "gate" specified in its "when" clause, as described above, is satisfied. And if the gate in the "when" clause is satisfied the task is executed at operation 516. The task may act as the start of a data pipeline. In some embodiments, the task may, in turn, execute other tasks in a data pipeline. The task-triggering techniques can be used to trigger tasks in the same account as well as across accounts, organizations, and deployments.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 6:
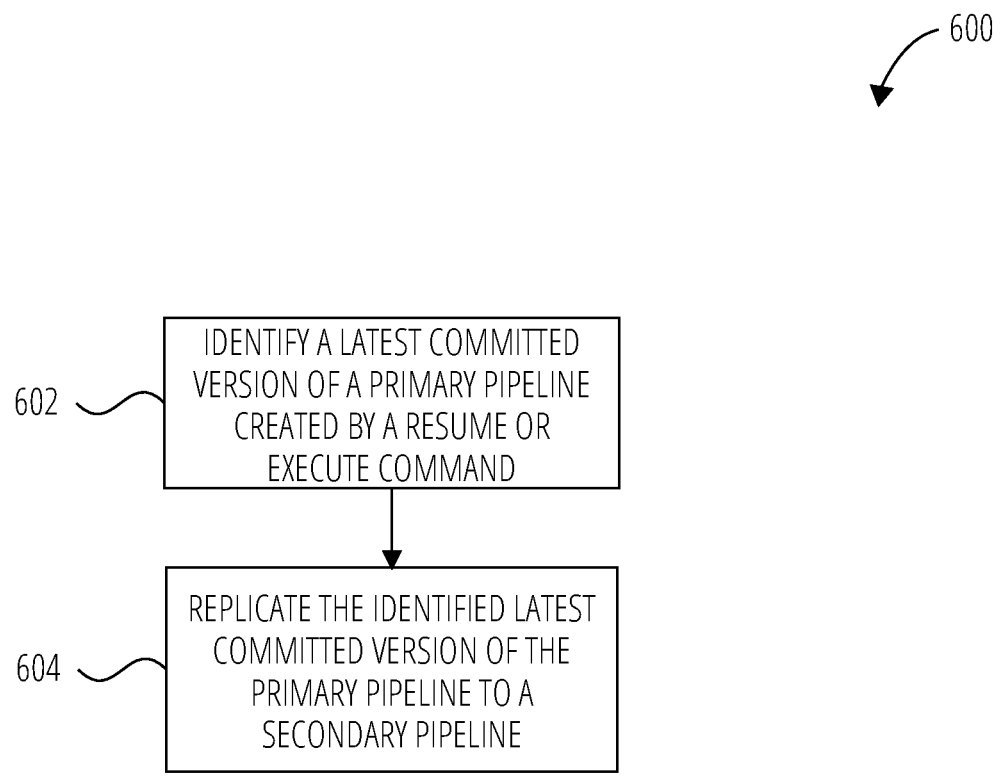
FIG. 6 is a flow diagram illustrating a method for replicating recurrently executing data pipelines, in accordance with some embodiments of the present disclosure.

FIG. 6 is a flow diagram illustrating a method 600 for replicating the latest committed version of a pipeline on a primary to a secondary in accordance with one example embodiment. The method 600 may be performed by one or more computational devices, as described below. Operations in the method 600 may be performed by the data pipeline replicator 232, using components (e.g., modules, engines) described above with respect to FIG. 2. Accordingly, the method 600 is described by way of example with reference to the data pipeline replicator 232. However, it shall be appreciated that at least some of the operations of the method 600 may be deployed on various other hardware configurations or be performed by similar components residing elsewhere. For example, some of the operations may be performed at the execution platform 102.

In block 602, the data pipeline replicator 232 identifies a latest committed version of a primary pipeline in response to (or created by) a "resume" or "execute" command. In block 604, the data pipeline replicator 232 replicates the identified latest committed version of the primary pipeline to a secondary pipeline.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 7:
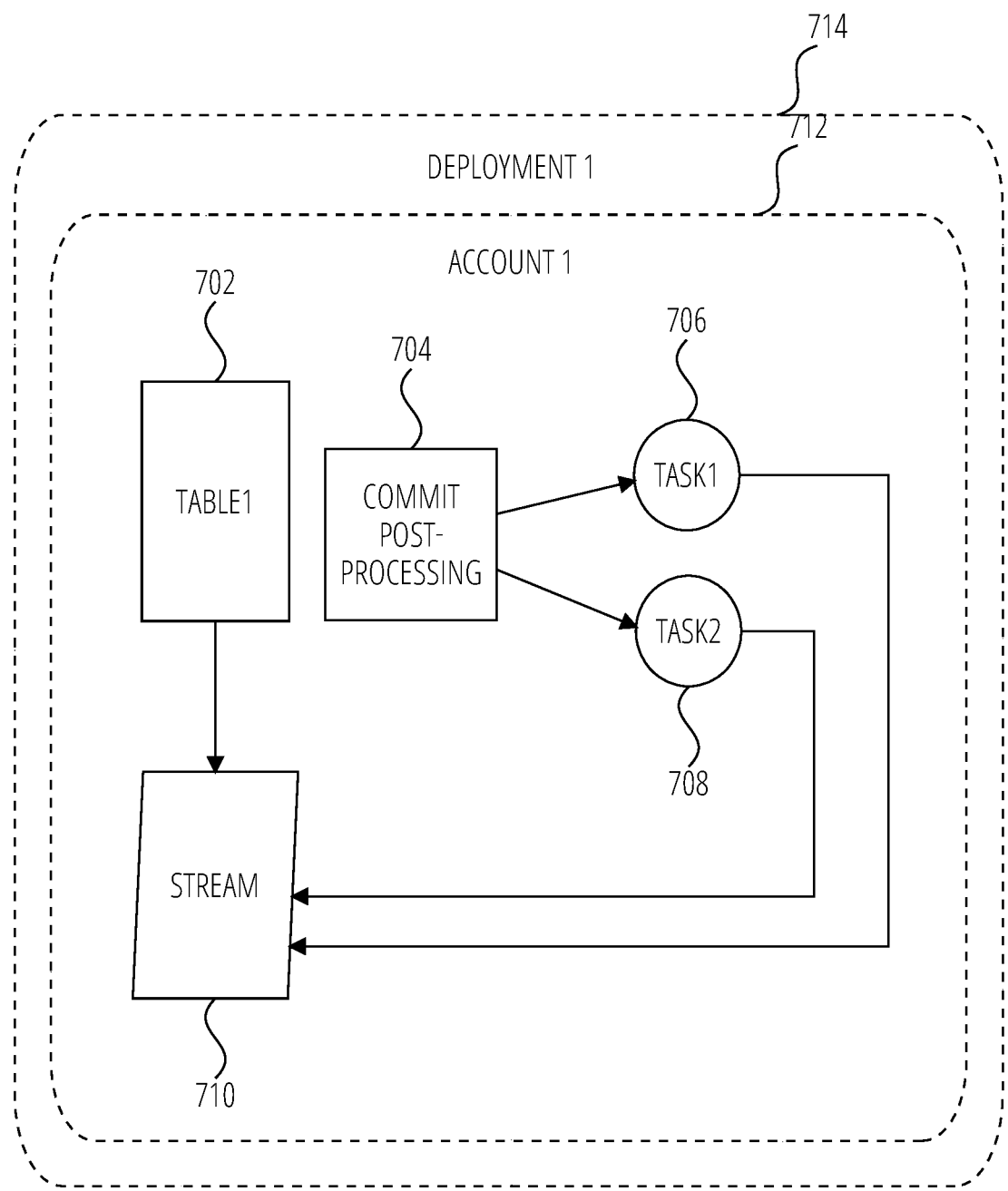
FIG. 7 illustrates triggering tasks in the same account in accordance with one example embodiment.

FIG. 7 illustrates triggering tasks in the same account in accordance with one example embodiment. The task may act as the start of a data pipeline. In some embodiments, the task may, in turn, execute other tasks in a data pipeline. The task-triggering techniques can be used to trigger tasks in the same account as well as across accounts, organizations, and deployments.

In FIG. 7, a deployment 1 714 is provided. The deployment 1 714 may represent an instance of a data system, as described above, and may represent an instance of a data system provided in a particular region and a cloud provider. An account 1 712 may be provided within the deployment 1 714. The account 1 712 may belong to a particular organization or customer of a multi-tenant data system as described herein. In the account 1 712, a table1 702 may be provided and stored. The table1 702 may be stored using the techniques as described above. Moreover, operations (e.g., DML operations) may be executed on the table1 702 using the computing architecture described above (e.g., compute service manager, execution platforms, etc.).

Here, a stream 710 may be generated from the table1 702. Stream 710 may be a virtual table showing CDC information of the table1 702. Moreover, two tasks task1 706, task2 708 are illustrated. These task1 706, task2 708 are triggered using the techniques described herein. For example, when a transaction (e.g., one or more DML operations) is executed on table1 702 resulting in a change to the data in the table1 702, post commit processing of the transaction triggers tasks task1 706 and task2 708. This triggering is synchronous with the post-commit processing, but execution of the task is asynchronous with respect to the triggering. Consequently, the execution of the task is decoupled from the normal transaction execution, and the task execution does not impact the post-commit processing of the transaction.

Tasks task1 706, task2 708 may then check stream 710 to determine if their respective "gate" specified in their "when" clauses, are satisfied. Each task task1 706, task2 708 may have their own gates. For example, the gate in task1 706 may specify a change to certain rows in table1 702 whereas the gate in task2 708 may specify a change to another set of rows in table1 702. These changes in the specified rows may be indicated in the stream 710. If the gate of the tasks task1 706, task2 708 are satisfied, the tasks task1 706, task2 708 may be executed. It could be that the change satisfies only one of the tasks (say, task1 706). In this example, task1 706 is executed and task2 708 is not executed. If the gates in both tasks task1 706, task2 708 are satisfied, both tasks may be executed in parallel. The tasks task1 706, task2 708 may act as the start of a data pipeline. In some embodiments, the tasks task1 706, task2 708 may in turn execute other tasks in a data pipeline.

Figure 8A:
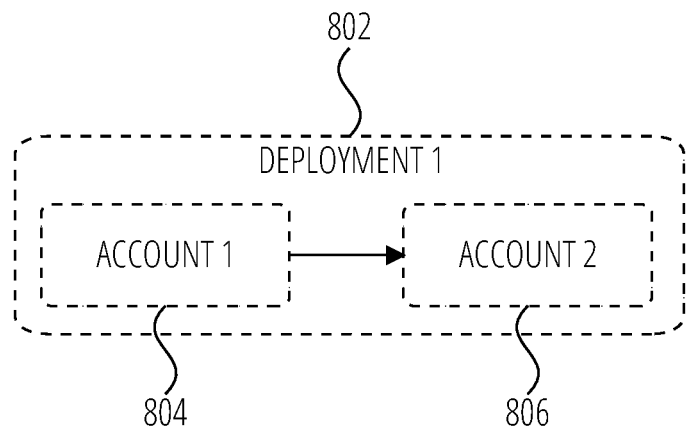
FIG. 8A illustrates triggering tasks across different accounts in accordance with one example embodiment.

FIG. 8A illustrates triggering tasks across different accounts in accordance with one example embodiment. For example, FIG. 8A describes a method for replicating a data pipeline from account 1 804 to account 2 806 within the same deployment 1 802.

The explicit user action commits a set of changes to multiple nodes. "Resume" or "Execute task" statements are selected as commands to commit all changes and to indicate that this is a new version of the pipeline. The "Resume" statement marks the pipeline as resumed, which means it is expected to run recurrently. The "Execute task" statement only schedules a single execution of the pipeline. A user can also choose to explicitly run a pipeline via "resume" or "execute" command and thus indicate that the pipeline is fit for running.

Figure 10:
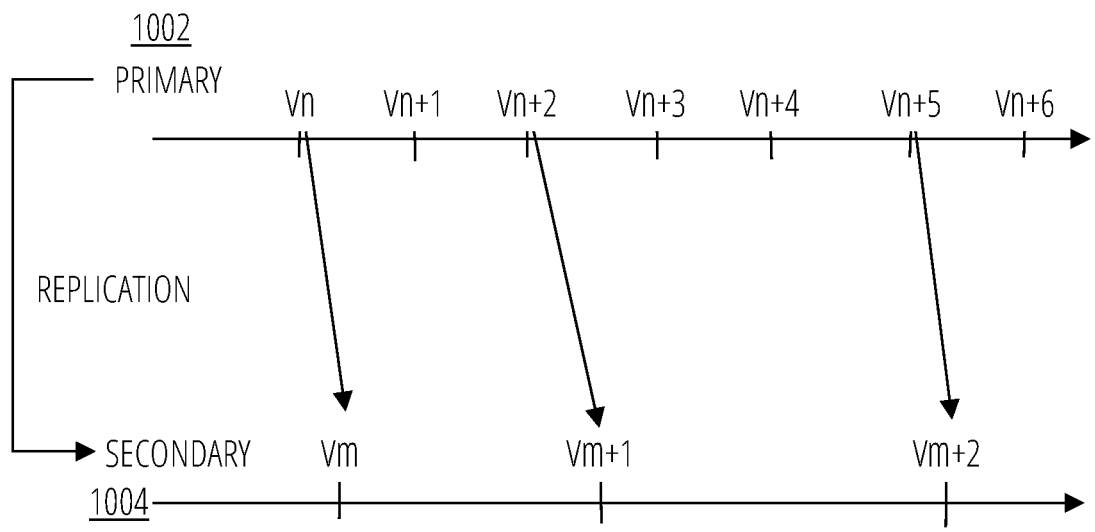
FIG. 10 illustrates an example of replicating a data pipeline in accordance with one example embodiment.

FIG. 8A illustrates a clear, linear (e.g., not branched) versioning of pipeline—as shown in FIG. 10 where there is a latest known committed version (or none before the first version is committed). This ensures that there is at most one latest committed version and given any two versions of the pipeline, the precedence/recency can be unambiguously determined algorithmically and by a human user.

Replication of the pipeline prefers the latest committed version over a more recent uncommitted version. This approach explicitly prioritizes consistency & committed version over a more recent and possibly inconsistent version of the pipeline.

Metadata information lets a user decide whether the version on the secondary is acceptable or needs to be upgraded before the pipelines are in "resume" state as a part of the failover.

Figure 8B:
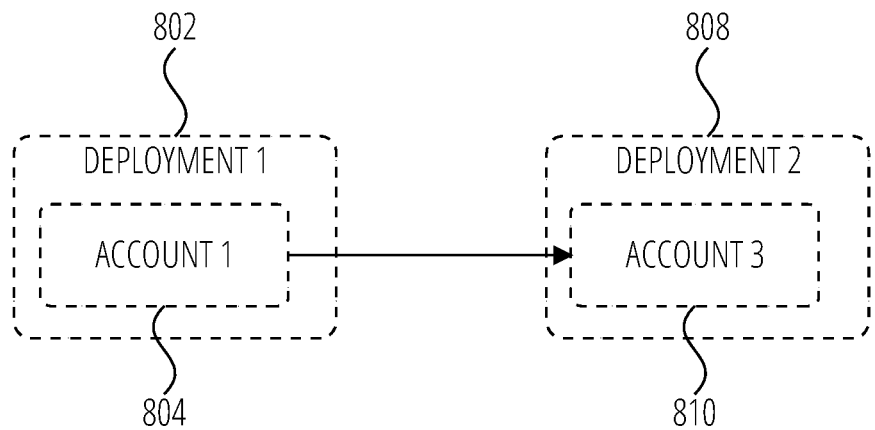
FIG. 8B illustrates triggering tasks across deployments in accordance with one example embodiment.

FIG. 8B illustrates triggering tasks across deployments in accordance with one example embodiment. The present application describes a method for replicating a data pipeline from account 1 804 of deployment 1 802 to account 3 810 of deployment 2 808.

Figure 9:
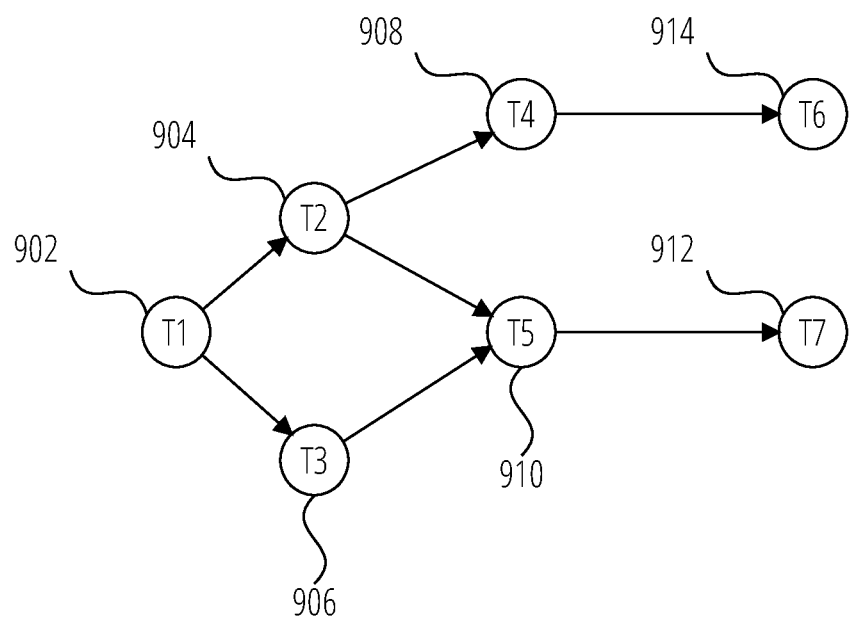
FIG. 9 illustrates a topology of recurring tasks in accordance with one example embodiment.

FIG. 9 illustrates a topology of recurring tasks in accordance with one example embodiment. Data pipeline comprised of tasks (T1 902, T2 904, T3 906, T4 908, T5 910, T7 912, and T6 914) that can be independently modified resulting in a snapshot that may not be ready to run.

FIG. 10 illustrates an example of replicating a data pipeline in accordance with one example embodiment. For example, FIG. 10 illustrates version timelines on the primary pipeline 1002 (with deployment 1, account i, pipeline k) and secondary pipeline 1004 (cross-deployment account mapping: deployment 2, account j, pipeline k). The secondary pipeline 1004 is typically in a different region and may be in a different cloud provider's region.

Figure 11A:
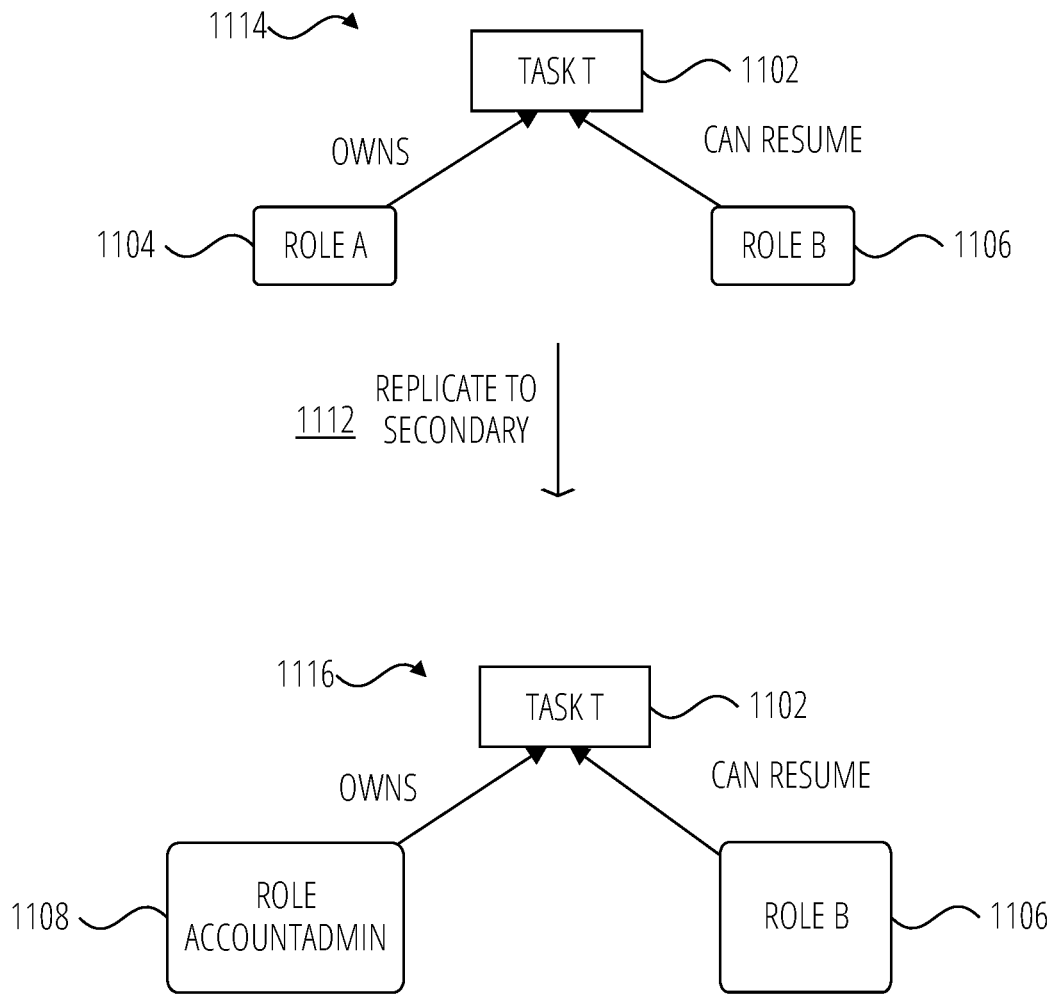
FIG. 11A illustrates an example of securing a task role in accordance with one example embodiment.

FIG. 11A illustrates an example of securing a task role (e.g., Prevention of Privilege of Escalation Attack Through OPERATE Privilege). For example, on a primary pipeline 1114, Task T 1102 is owned by Role A 1104 and since tasks execute using the privileges of its owner role, Task T 1102 will execute using role A's privileges.

Additionally, Role A 1104 grants the OPERATE privilege to Role B 1106 for Task T 1102, which allows Role B 1106 to RESUME or SUSPEND the task. A replication refresh 1112 occurs and replicates Task T 1102 over to the secondary pipeline 1116.

If Role A 1104 is somehow not replicated on the secondary pipeline 1116 because the user specified to only replicate database-level objects, Role A 1104 cannot be the owner of Task T 1102 on the secondary pipeline 1116. The design falls back to making the Role ACCOUNTADMIN 1108 the owner of Task T 1102. Falling back to the ACCOUNTADMIN (a special, highly privileged and trusted role) as owner for replicated objects is the default behavior for replicating objects whose owner cannot be replicated correctly. This is to prevent granting object access to less privileged or trusted roles. Because its owner role cannot be replicated correctly, the Task T 1102 is suspended to prevent it from running with escalated privileges.

Figure 11B:
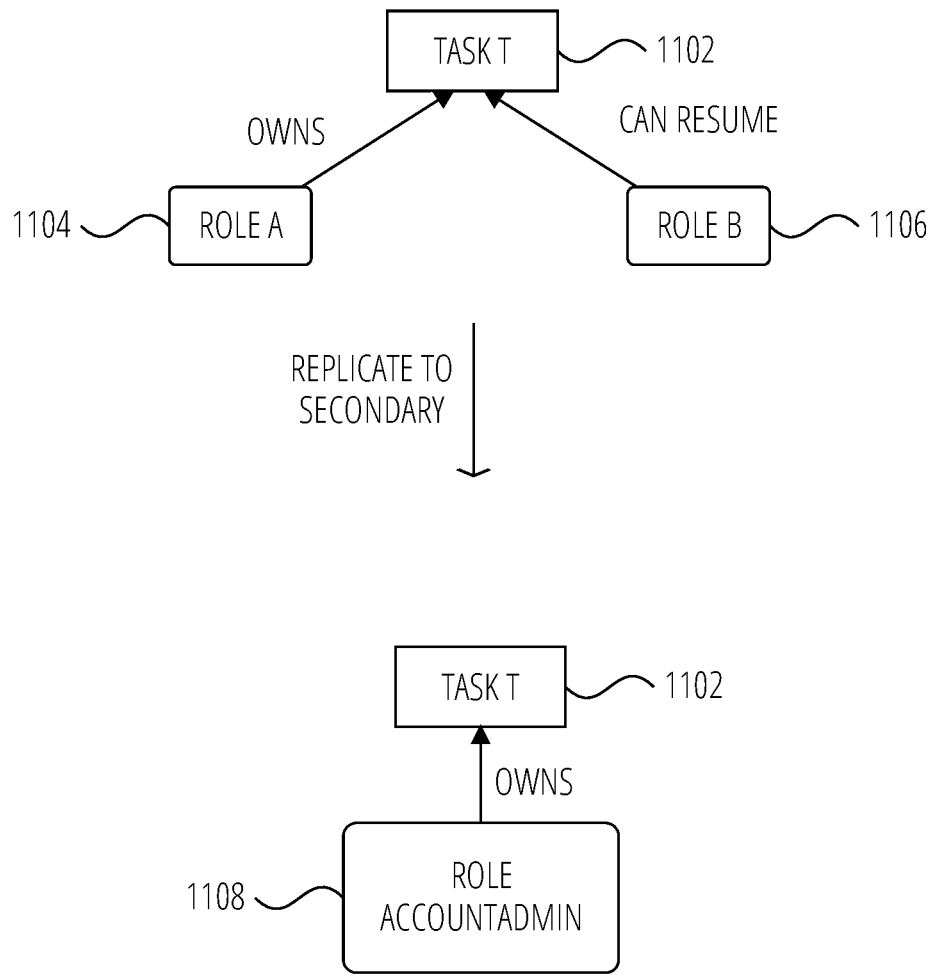
FIG. 11B illustrates an example of securing a task role in accordance with one example embodiment.

If Role B 1106 is replicated on the secondary pipeline 1116 from a previous refresh, in a naive implementation, the OPERATE privilege on Task T 1102 would also be replicated to Role B 1106. However, in a failover to the secondary pipeline 1116, Role B 1106 will be able to RESUME Task T 1102 which will execute using its owner—the ACCOUNTADMIN's privileges. In effect, Role A 1104 and Role B 1106 could work together to execute arbitrary commands using the escalated privileges of the ACCOUNTADMIN. FIG. 11B illustrates a solution to prevent this attack.

FIG. 11B illustrates an example of securing a task role in accordance with one example embodiment. To prevent the potential attack described in FIG. 11A, all grants (such as OPERATE grants) are revoked on tasks that cannot be replicated with the correct owner role. So in this case, Task T 1102 will still be owned by Role ACCOUNTADMIN 1108 but Role B 1106 will not have the OPERATE privilege on Task T 1102 and cannot RESUME Task T 1102. The only role now capable of resuming Task T 1102 is Role ACCOUNTADMIN 1108 who can do so, or grant Task T 1102 to a different owner at its own discretion.

Figure 11C:
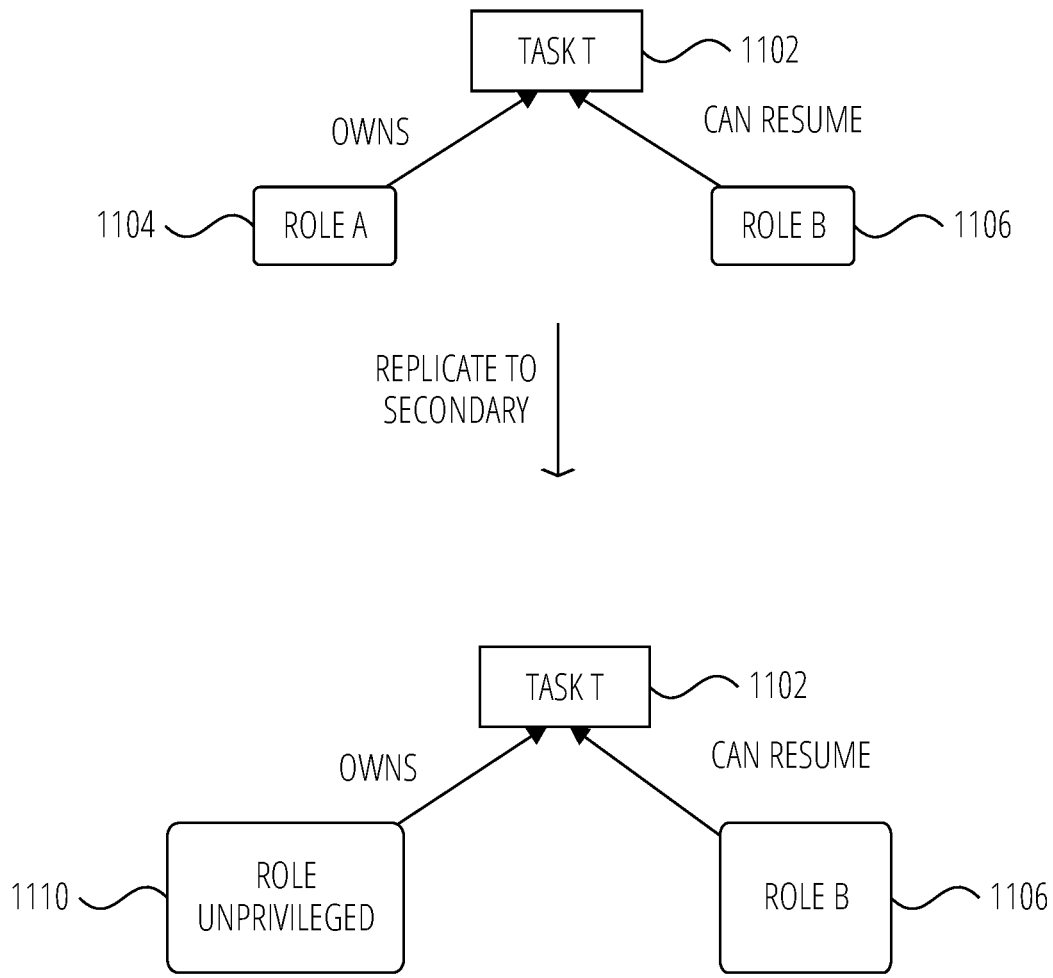
FIG. 11C illustrates an example of securing a task role in accordance with one example embodiment.

FIG. 11C illustrates an example of securing a task role in accordance with one example embodiment. Alternatively, Task T 1102 is granted to a special, system-defined role (e.g., Role UNPRIVILEGED 1110) that has no privileges, instead of falling back to the ACCOUNTADMIN role as the owner. This way, even if Role B 1106 resumes Task T 1102 and executes it, Role B 1106 will not be able to access or modify anything.

When the task graph cannot be replicated with the correct role, the system: implicitly SUSPENDS the root task (which is sufficient to prevent the entire graph from running) AND implicitly revoke all OPERATE privileges on the root task OR assign the owner role of the task graph to a special unprivileged role, to prevent privilege escalation attacks where Role A 1104 and Role B 1106 try to run commands using another role's privileges.

In another example, privileges and entities are not replicated/updated atomically. This can result in some other role able to see entity info they do not have privilege to access. There are two ways to tackle this: (1) make sure to read privileges and entities in the same transaction (so it is consistent) and/or (2) ignore grants that are created after the replication start timestamp.

Figure 12:
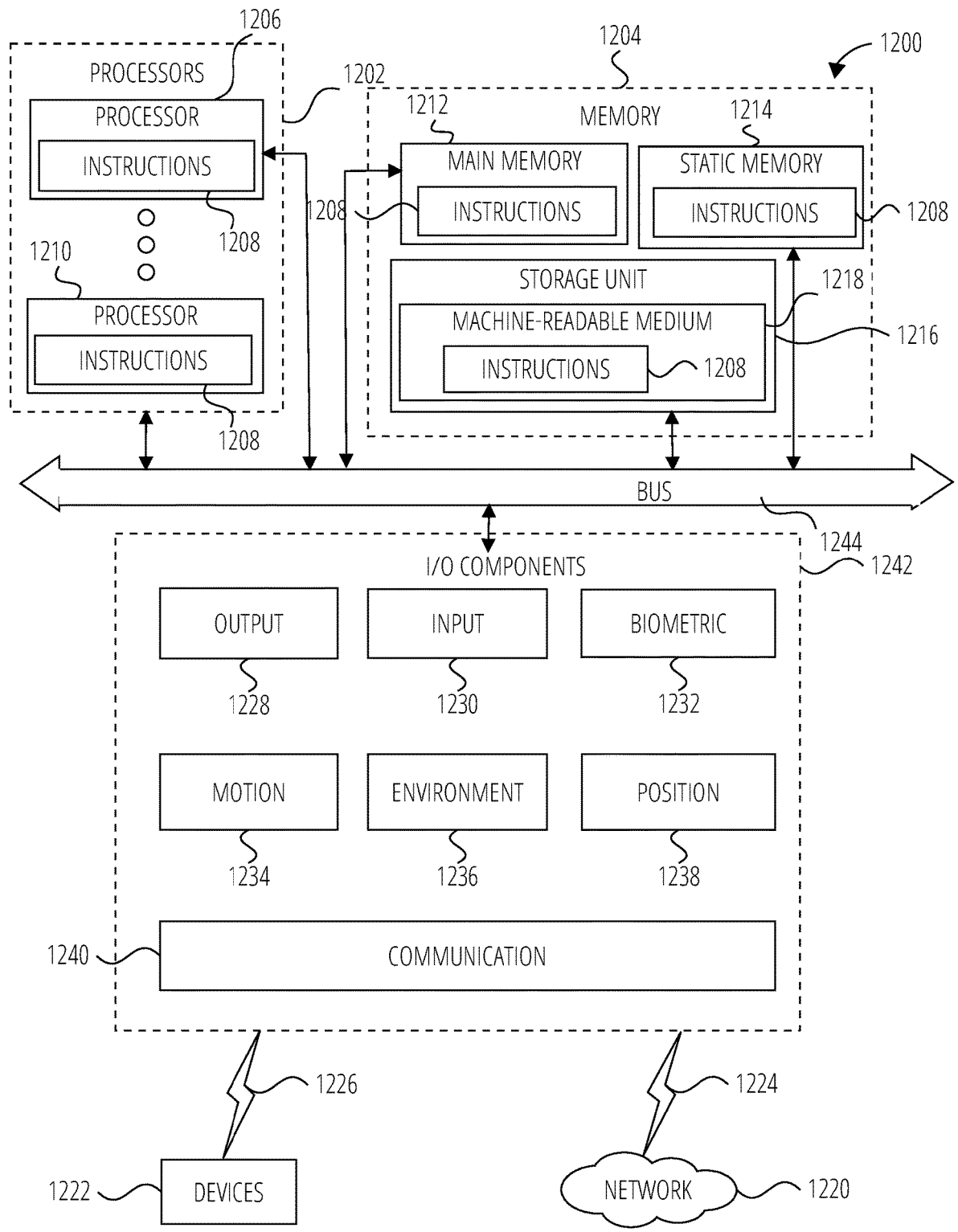
FIG. 12 is a diagrammatic representation of a machine in the form of a computer system within which a set of instructions may be executed for causing the machine to perform any one or more of the methodologies discussed herein, according to an example embodiment.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include Processors 1202, memory 1204, and I/O Components 1242, which may be configured to communicate with each other via a bus 1244. In an example embodiment, the Processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1206 and a Processor 1210 that execute the instructions 1208. The term "Processor" is intended to include multi-core Processors that may comprise two or more independent Processors (sometimes referred to as "cores") that may execute instructions contemporaneously. Although FIG. 12 shows multiple Processors 1202, the machine 1200 may include a single Processor with a single core, a single Processor with multiple cores (e.g., a multi-core Processor), multiple Processors with a single core, multiple Processors with multiples cores, or any combination thereof.

The memory 1204 includes a main memory 1212, a static memory 1214, and a storage unit 1216, both accessible to the Processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the Processors 1202 (e.g., within the Processor's cache memory), or any suitable combination thereof, during execution thereof by the machine 1200.

The I/O Components 1242 may include a wide variety of Components to receive input, provide output, produce output, transmit information, exchange information, capture measurements, and so on. The specific I/O Components 1242 that are included in a particular machine will depend on the type of machine. For example, portable machines such as mobile phones may include a touch input device or other such input mechanisms, while a headless server machine will likely not include such a touch input device. It will be appreciated that the I/O Components 1242 may include many other Components that are not shown in FIG. 12. In various example embodiments, the I/O Components 1242 may include output Components 1228 and input Components 1230. The output Components 1228 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1230 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1242 may include biometric Components 1232, motion Components 1234, environmental Components 1236, or position Components 1238, among a wide array of other Components. For example, the biometric Components 1232 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1234 include acceleration sensor Components (e.g., accelerometer), gravitation sensor Components, rotation sensor Components (e.g., gyroscope), and so forth. The environmental Components 1236 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1238 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1242 further include communication Components 1240 operable to couple the machine 1200 to a network 1220 or devices 1222 via a coupling 1224 and a coupling 1226, respectively. For example, the communication Components 1240 may include a network interface Component or another suitable device to interface with the network 1220. In further examples, the communication Components 1240 may include wired communication Components, wireless communication Components, cellular communication Components, Near Field Communication (NFC) Components, Bluetooth® Components (e.g., Bluetooth® Low Energy), WiFi® Components, and other communication Components to provide communication via other modalities. The devices 1222 may be another machine or any of a wide variety of peripheral devices (e.g., a peripheral device coupled via a USB).

Moreover, the communication Components 1240 may detect identifiers or include Components operable to detect identifiers. For example, the communication Components 1240 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the Processors 1202) and/or storage unit 1216 may store one or more sets of instructions and data structures (e.g., software) embodying or used by any one or more of the methodologies or functions described herein. These instructions (e.g., the instructions 1208), when executed by Processors 1202, cause various operations to implement the disclosed embodiments.

The instructions 1208 may be transmitted or received over the network 1220, using a transmission medium, via a network interface device (e.g., a network interface Component included in the communication Components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Described implementations of the subject matter can include one or more features, alone or in combination as illustrated below by way of example.

EXAMPLES

Example 1 is a computer-implemented method comprising: detecting a committed version of recurrently executed tasks of a first data pipeline on a primary deployment that is hosted on a first cloud service; and replicating the committed version of the recurrently executed tasks to a second data pipeline on a secondary deployment that is hosted on a second cloud service.

Example 2 includes the computer-implemented method of example 1, wherein detecting the committed version of the recurrently executed tasks of a first data pipeline is in response to detecting a "resume" or "execute" command for the first data pipeline.

Example 3 includes the computer-implemented method of example 1, further comprising: providing a table in a first account of a first multi-tenant network database system of the first cloud service; generating change data capture information showing changes to the table; creating a sequential plurality of tasks in the first account; executing a transaction resulting in a change to the table; and triggering execution of the sequential plurality of tasks based on commit post-processing of the transaction.

Example 4 includes the computer-implemented method of example 3, further comprising: in response to triggering execution of the sequential plurality of tasks based on commit post-processing of the transaction, replicating the committed version of the recurrently executed tasks to a second account of a second multi-tenant network database system of the second cloud service.

Example 5 includes the computer-implemented method of example 3, further comprising: maintaining a list of tasks referencing the table.

Example 6 includes the computer-implemented method of example 1, wherein the first data pipeline corresponds to a first deployment, a first account, and a first pipeline, wherein the second data pipeline corresponds to a second deployment, a second account, and a second pipeline.

Example 7 includes the computer-implemented method of example 6, wherein the second deployment is hosted on a same cloud service of the first deployment.

Example 8 includes the computer-implemented method of example 1, further comprising: detecting that a task cannot be replicated as-is on the second data pipeline, a first user being an owner of the task on the first data pipeline, the first user providing an operate privilege to a second user on the first data pipeline; and in response to detecting that the task cannot be replicated as-is on the second data pipeline, suspending a root task on the second data pipeline for the first and second user.

Example 9 includes the computer-implemented method of example 8, further comprising: revoking all OPERATE privileges on the second data pipeline.

Example 10 includes the computer-implemented method of example 8, further comprising: assigning an unprivileged role to the first user on the second data pipeline.

Example 11 is a computing apparatus comprising: a processor; and a memory storing instructions that, when executed by the processor, configure the apparatus to: detect a committed version of recurrently executed tasks of a first data pipeline on a primary deployment that is hosted on a first cloud service; and replicate the committed version of the recurrently executed tasks to a second data pipeline on a secondary deployment that is hosted on a second cloud service.

Example 12 includes the computing apparatus of example 11, wherein detecting the committed version of the recurrently executed tasks of a first data pipeline is in response to detecting a "resume" or "execute" command for the first data pipeline.

Example 13 includes the computing apparatus of example 11, wherein the instructions further configure the apparatus to: provide a table in a first account of a first multi-tenant network database system of the first cloud service; generate change data capture information showing changes to the table; create a sequential plurality of tasks in the first account; execute a transaction resulting in a change to the table; and trigger execution of the sequential plurality of tasks based on commit post-processing of the transaction.

Example 14 includes the computing apparatus of example 13, wherein the instructions further configure the apparatus to: in response to triggering execution of the sequential plurality of tasks based on commit post-processing of the transaction, replicating the committed version of the recurrently executed tasks to a second account of a second multi-tenant network database system of the second cloud service.

Example 15 includes the computing apparatus of example 13, wherein the instructions further configure the apparatus to: maintain a list of tasks referencing the table.

Example 16 includes the computing apparatus of example 11, wherein the first data pipeline corresponds to a first deployment, a first account, and a first pipeline, wherein the second data pipeline corresponds to a second deployment, a second account, and a second pipeline.

Example 17 includes the computing apparatus of example 16, wherein the second deployment is hosted on a same cloud service of the first deployment.

Example 18 includes the computing apparatus of example 11, wherein the instructions further configure the apparatus to: detect that a task cannot be replicated as-is on the second data pipeline, a first user being an owner of the task on the first data pipeline, the first user providing an operate privilege to a second user on the first data pipeline; and in response to detecting that the task cannot be replicated as-is on the second data pipeline, suspend a root task on the second data pipeline for the first and second user.

Example 19 includes the computing apparatus of example 18, wherein the instructions further configure the apparatus to: revoke all OPERATE privileges on the second data pipeline; and assign an unprivileged role to the first user on the second data pipeline.

Example 20 is a non-transitory computer-readable storage medium, the computer-readable storage medium including instructions that when executed by a computer, cause the computer to: detect a committed version of recurrently executed tasks of a first data pipeline on a primary deployment that is hosted on a first cloud service; and replicate the committed version of the recurrently executed tasks to a second data pipeline on a secondary deployment that is hosted on a second cloud service.

What is claimed is:

1. A computer-implemented method comprising:
   detecting, using one or more processors of a server, a resume command entered by a user on a client device to resume execution of a first data pipeline on a first deployment that is hosted on a first cloud service, the first data pipeline comprising a first plurality of computing tasks that are configured for execution on the first cloud service, the resume command indicating an explicit user action that changes to the first data pipeline have been made and are complete and that the first data pipeline is execution-ready;
   in response to detecting the resume command for the first data pipeline, detecting a latest committed version of recurrently executed tasks of the first data pipeline and an uncommitted version of the recurrently executed tasks of the first data pipeline that is more recent than the latest committed version;
   in response to detecting the resume command for the first data pipeline, accessing metadata of a second data pipeline on a second deployment that is hosted on a second cloud service and providing the metadata to the client device, the first data pipeline and the second data pipeline comprising same computing tasks;

receiving a confirmation from the client device indicating that a version of the second data pipeline is acceptable for resuming execution of the first data pipeline on the second cloud service;

in response to detecting the resume command for the first data pipeline, selecting the latest committed version of recurrently executed tasks of the first data pipeline over the uncommitted version of recurrently executed tasks of the first data pipeline for the resume command;

in response to receiving the confirmation from the client device, replicating the latest committed version of the recurrently executed tasks to the second data pipeline on the second deployment that replicates a database of the first deployment in another geographic location, the second data pipeline comprising a second plurality of computing tasks that are configured for execution on the second cloud service, the first data pipeline corresponding to the first deployment, the second data pipeline corresponding to the second deployment;

detecting that a task from the latest committed version of the recurrently executed tasks cannot be replicated on the second data pipeline based on a first role that owns the task not being replicated on the second data pipeline, the first role providing an operate privilege to a second role on the first data pipeline that allows a second user to resume or suspend the task; and in response to detecting that the task cannot be replicated on the second data pipeline based on the first role that owns the task not being replicated on the second data pipeline, suspending a root task on the second data pipeline for the first role and the second user.

2. The computer-implemented method of claim 1, wherein detecting the latest committed version of the recurrently executed tasks of the first data pipeline is in response to detecting an execute command for the first data pipeline.

3. The computer-implemented method of claim 1, further comprising:
providing a table in a first account of a first multi-tenant network database system of the first cloud service;
generating change data capture information showing changes to the table;
creating a sequential plurality of tasks in the first account;
executing a transaction resulting in a change to the table; and
triggering execution of the sequential plurality of tasks based on commit post-processing of the transaction.

4. The computer-implemented method of claim 3, further comprising:
in response to triggering execution of the sequential plurality of tasks based on commit post-processing of the transaction, replicating the latest committed version of the recurrently executed tasks to a second account of a second multi-tenant network database system of the second cloud service.

5. The computer-implemented method of claim 3, further comprising:
maintaining a list of tasks referencing the table.

6. The computer-implemented method of claim 1, wherein the second deployment is hosted on a same cloud service as the first deployment.

7. The computer-implemented method of claim 1, wherein the first role that owns the task is not replicated on the second data pipeline based on the replicating being constrained to database-level objects.

8. The computer-implemented method of claim 1, further comprising:
revoking all operate privileges on the second data pipeline.

9. The computer-implemented method of claim 1, further comprising:
assigning the task to an unprivileged role that does not own the task in the second data pipeline.

10. A system comprising:
at least one processor; and
memory storing instructions that, when executed by the at least one processor, configure the system to perform operations comprising:
detecting, using one or more processors of a server, a resume command entered by a user on a client device to resume execution of a first data pipeline on a first deployment that is hosted on a first cloud service, the first data pipeline comprising a first plurality of computing tasks that are configured for execution on the first cloud service, the resume command indicating an explicit user action that changes to the first data pipeline have been made and are complete and that the first data pipeline is execution-ready;

in response to detecting the resume command for the first data pipeline, detecting a latest committed version of recurrently executed tasks of the first data pipeline and an uncommitted version of the recurrently executed tasks of the first data pipeline that is more recent than the latest committed version;

in response to detecting the resume command for the first data pipeline, accessing metadata of a second data pipeline on a second deployment that is hosted on a second cloud service and providing the metadata to the client device, the first data pipeline and the second data pipeline comprising same computing tasks;

receiving a confirmation from the client device indicating that a version of the second data pipeline is acceptable for resuming execution of the first data pipeline on the second cloud service;

in response to detecting the resume command for the first data pipeline, selecting the latest committed version of recurrently executed tasks of the first data pipeline over the uncommitted version of recurrently executed tasks of the first data pipeline for the resume command;

in response to receiving the confirmation from the client device, replicating the latest committed version of the recurrently executed tasks to the second data pipeline on the second deployment that replicates a database of the first deployment in another geographic location, the second data pipeline comprising a second plurality of computing tasks that are configured for execution on the second cloud service, the first data pipeline corresponding to the first deployment, the second data pipeline corresponding to the second deployment;

detecting that a task from the latest committed version of the recurrently executed tasks cannot be replicated on the second data pipeline based on a first role that owns the task not being replicated on the second data pipeline, the first role providing an operate privilege to a second role on the first data pipeline that allows a second user to resume or suspend the task; and in response to detecting that the task cannot be replicated on the second data pipeline based on the first role that owns the task not being replicated on the second data pipeline, suspending a root task on the second data pipeline for the first role and the second user.

11. The system of claim 10, wherein detecting the latest committed version of the recurrently executed tasks of the first data pipeline is in response to detecting an execute command for the first data pipeline.

12. The system of claim 10, wherein the operations comprise:
providing a table in a first account of a first multi-tenant network database system of the first cloud service;
generating change data capture information showing changes to the table;
creating a sequential plurality of tasks in the first account;
executing a transaction resulting in a change to the table; and
triggering execution of the sequential plurality of tasks based on commit post-processing of the transaction.

13. The system of claim 12, wherein the operations comprise:
in response to triggering execution of the sequential plurality of tasks based on commit post-processing of the transaction, replicating the latest committed version of the recurrently executed tasks to a second account of a second multi-tenant network database system of the second cloud service.

14. The system of claim 12, wherein the operations comprise:
maintaining a list of tasks referencing the table.

15. The system of claim 10, wherein the second deployment is hosted on a same cloud service as the first deployment.

16. The system of claim 10, wherein the first role that owns the task is not replicated on the second data pipeline based on the replicating being constrained to database-level objects.

17. The system of claim 16, wherein the operations comprise:
revoking all operate privileges on the second data pipeline; and
assigning the task to an unprivileged role that does not own the task in the second data pipeline.

18. A non-transitory computer-readable storage medium, the computer-readable storage medium including instructions that when executed by at least one processor, cause the at least one processor to perform operations comprising:
detecting, using one or more processors of a server, a resume command entered by a user on a client device to resume execution of a first data pipeline on a first deployment that is hosted on a first cloud service, the first data pipeline comprising a first plurality of computing tasks that are configured for execution on the first cloud service, the resume command indicating an explicit user action that changes to the first data pipeline have been made and are complete and that the first data pipeline is execution-ready;
in response to detecting the resume command for the first data pipeline, detecting a latest committed version of recurrently executed tasks of the first data pipeline and an uncommitted version of the recurrently executed tasks of the first data pipeline that is more recent than the latest committed version;
in response to detecting the resume command for the first data pipeline, accessing metadata of a second data pipeline on a second deployment that is hosted on a second cloud service and providing the metadata to the client device, the first data pipeline and the second data pipeline comprising same computing tasks;
receiving a confirmation from the client device indicating that a version of the second data pipeline is acceptable for resuming execution of the first data pipeline on the second cloud service;
in response to detecting the resume command for the first data pipeline, selecting the latest committed version of recurrently executed tasks of the first data pipeline over the uncommitted version of recurrently executed tasks of the first data pipeline for the resume command;
in response to receiving the confirmation from the client device, replicating the latest committed version of the recurrently executed tasks to the second data pipeline on the second deployment that replicates a database of the first deployment in another geographic location, the second data pipeline comprising a second plurality of computing tasks that are configured for execution on the second cloud service, the first data pipeline corresponding to the first deployment, the second data pipeline corresponding to the second deployment;
detecting that a task from the latest committed version of the recurrently executed tasks cannot be replicated on the second data pipeline based on a first role that owns the task not being replicated on the second data pipeline, the first role providing an operate privilege to a second role on the first data pipeline that allows a second user to resume or suspend the task; and
in response to detecting that the task cannot be replicated on the second data pipeline based on the first role that owns the task not being replicated on the second data pipeline, suspending a root task on the second data pipeline for the first role and the second user.

* * * * *